(No Model.) 2 Sheets—Sheet 1.
E. THOMSON.
ELECTRIC MOTOR.
No. 526,169. Patented Sept. 18, 1894.
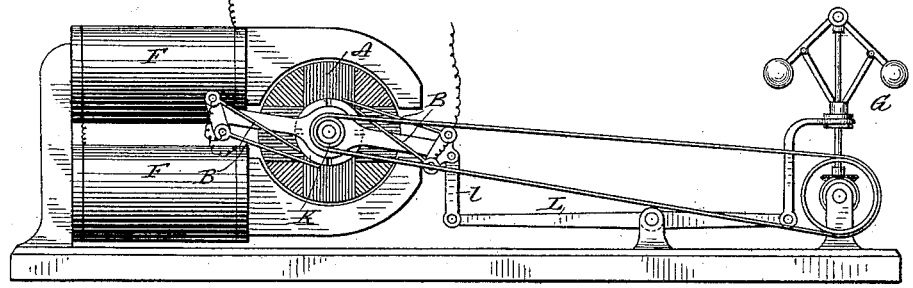
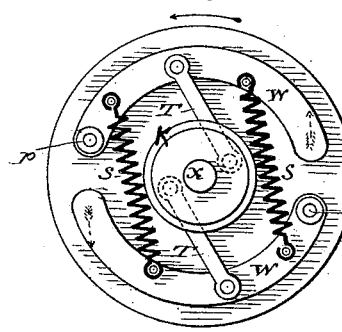 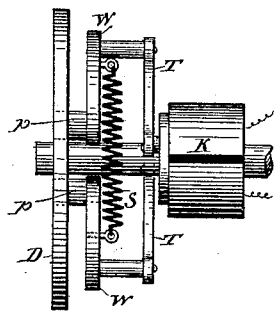 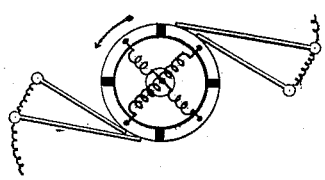
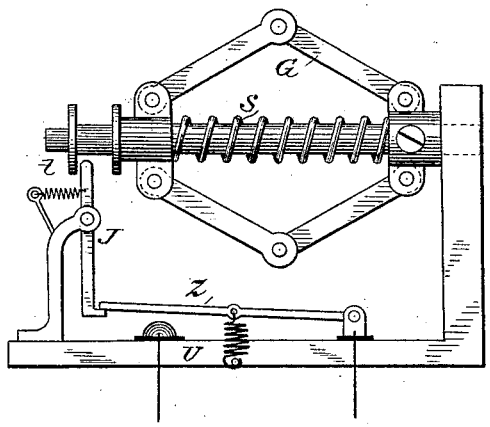
WITNESSES:
Ernest Mshagen
Thos. Doomey
INVENTOR
Elihu Thomson
BY
H. C. Townsend
his ATTORNEY (No Model.) 2 Sheets—Sheet 2.
E. THOMSON.
ELECTRIC MOTOR.
No. 526,169. Patented Sept. 18, 1894.
Fig. 5,
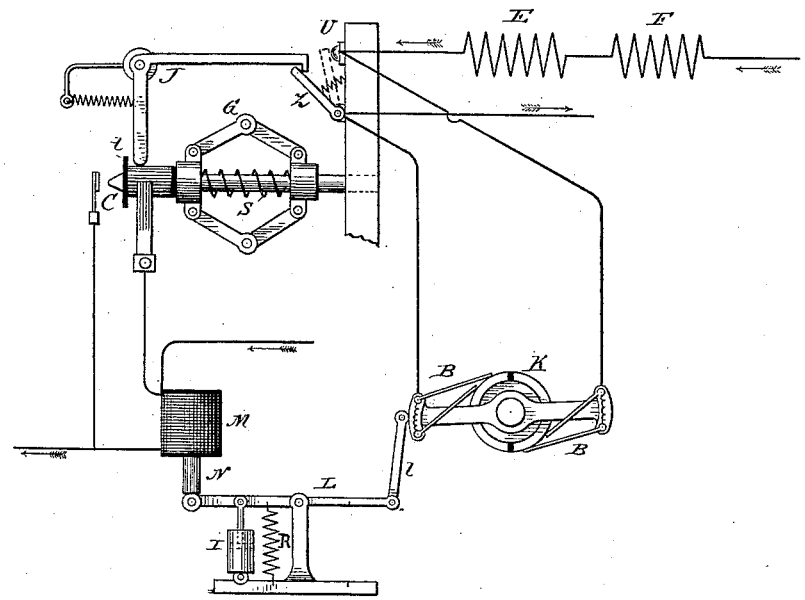
Fig. 8,
Fig. 7.
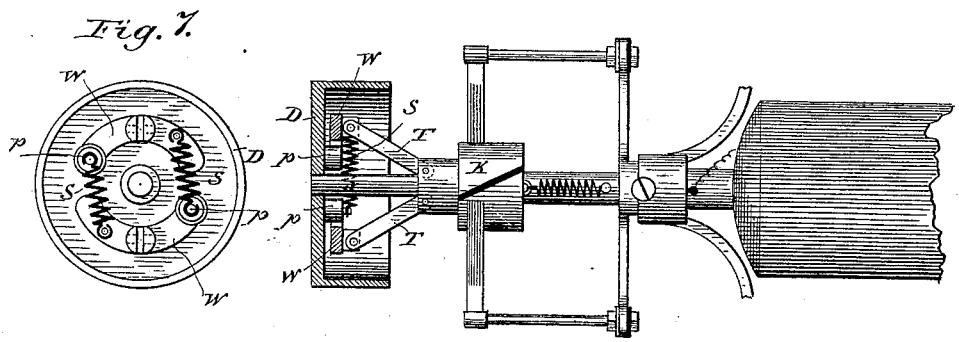
WITNESSES:
Ernest Abshagen
Thos. Toomey
INVENTOR
Elihu Thomson
BY
H. L. Townsend
his ATTORNEY

UNITED STATES PATENT OFFICE.

ELIHU THOMSON, OF LYNN, MASSACHUSETTS, ASSIGNOR TO THE THOMSON-HOUSTON ELECTRIC COMPANY OF CONNECTICUT.

ELECTRIC MOTOR.

SPECIFICATION forming part of Letters Patent No. 526,169, dated September 18, 1894.

Application filed August 30, 1884. Serial No. 141,793. (No model.)

*To all whom it may concern:*

Be it known that I, ELIHU THOMSON, a citizen of the United States, and a resident of Lynn, in the county of Essex and State of Massachusetts, have invented certain new and useful Improvements in Electric Motors, of which the following is a specification.

My invention relates to certain improvements in the devices for controlling the operation of electric motors and is designed to provide a means whereby the motor may be brought to rest automatically, as hereinafter described, in any contingency, but more particularly in case the devices used for controlling or governing its speed should fail to operate properly.

Figure 1, is a side elevation of an electric motor to which my invention may be applied. Fig. 2, is an end view, and Fig. 3, a side view of a modification in the construction of the speed responsive device that may be employed in carrying out the invention. Fig. 4, is a side view of the commutator cylinder, brushes and armature connections. Fig. 5, shows the manner of applying the automatic switch employed for cutting off current from the motor armature on an increase of the speed to a predetermined point. Fig. 6, shows a modified form of the stopping switch. Figs. 7 and 8, show other forms of adjustable commutator and the manner of operating the same from the speed governor or indicator.

Referring to Fig. 1, there is shown a motor consisting of an armature A, of any approved type, field magnets F, F, suitably framed and supported. A commutator whose brushes are indicated at B, B, is provided as usual. The brushes are here shown as movable around the commutator cylinder for the purpose of obtaining a commutator adjustment, but the same effect may be produced by changing the set of the commutator cylinder circumferentially as the shaft or (when the dividing spaces between the segments are oblique) by moving either the cylinder or the brushes longitudinally in a plane transverse to the plane of rotation. Driven by the same power which drives the motor and at the same relative speed is a governor G, of the centrifugal type, any good form being useful. This governor is attached as shown so as to impart movement to a lever L, upon increase of speed, and by the link *l*, to set the brush holder and brushes B, B, to a new position. The extent and direction of movement to be imparted will depend upon the nature, proportion and relative strength of field used, as also on the nature, proportion, and peculiarities of armature, and form therefore no definable part of my invention excepting as hereinbefore stated, that is to say the extent and direction of movement on an increase of speed is to be such as to set the commutator into condition where the motor will be less efficient. Or in other words, there will be less effective pull on the armature for the same current under the increased speed. It is sufficient in all cases to determine the direction and extent or amount of change in the set of the commutator which lowers the speed and make the connections to accord thereto. Instead of moving the brushes, it is sometimes preferable to adjust the commutator cylinder itself upon the shaft by means of a suitable governor and its connections. Such a modification is shown in Figs. 2, 3, and 4.

D, is a disk upon the shaft of the motor and revolving therewith. It carries upon pivots *p, p,* two movable wings or arc shaped pieces shown at W, W, the pivots *p, p,* being at one end of each so as to allow the pieces W, W, to swing outward under the action of centrifugal force. These wings or pieces W, W, are connected by links T, T, to a commutator K, movable upon the shaft X, in its plane of rotation, so that when the wings W, W, are moved outward by centrifugal force the commutator cylinder K, is rotated about the shaft X, to a new position. Springs S, S, restrain the movement of the wings W, W, and the speed of running is determined by their power to counteract such movement. The movement to be given to K, is shown as a forward movement upon increase of speed and this will generally be found to be the direction needed with ordinary armature construction.

Fig. 4, indicates a simple commutator of four pieces with two armature coils and four brushes bearing upon the commutator, and I have used this as a typical construction it being quite simple.

In Fig. 5, the speed responsive device or governor G, does not act directly to move or adjust the commutator but acts to control the flow of current to a motor magnet. In the example shown this is done by opening a shunt contact C, upon increase of speed, beyond the normal and so to admit current to a magnet coil M, whose armature N, imparts movement to the lever L, and from thence a connection by the link $l$, to the support of the commutator brushes B, B, gives the movement to them likewise.

The closure of contact C, shunts M, and the spring R, acts to restore the lever and brushes to their former position. A dash pot I, checks a too-sudden movement. In normal working the contact C, will be quickly closed and opened with such rapidity as to maintain the brushes B, B, in a position to give the regulated speed. As an additional safeguard to prevent the motor by accident running away I provide a shunting switch Z, U, for its armature (or for the whole motor if preferred) normally held open by a detent lever J. Upon abnormal speed a flange $t$, is brought by the governor G, against J, and trips it, and the switch Z, U, at once closes being so impelled by a suitable spring as shown.

The device just described is clearly shown in slightly different form in Fig. 6, where all the parts are lettered as in Fig. 5.

In Figs. 7 and 8, the commutator adjustment whereby the brushes are set with relation to the commutator plates at more or less effective points is accomplished in still another but equivalent way. In this instance the dividing spaces between the commutator plates are made oblique, and the width of the brushes is made somewhat less than that of the commutator plates so that by moving either the brushes or the cylinder longitudinally, or in a direction transverse to the plane of revolution, the time at which the brushes shall touch and leave the plates may be varied, thus producing the same practical effect as is produced by moving the brushes or the cylinder in the plane of revolution. The commutator cylinder is in this instance movable longitudinally on the armature shaft and is connected by links with the swinging arms W, so that the movement of the latter by centrifugal force will move the commutator cylinder.

I have described herein an adjustment, broadly, of the commutator and by the term commutator I include the cylinder and the brushes operating in connection therewith to constitute the commutating appliance. As before explained the movement of either element of the commutator, that is to say, the commutator cylinder or the commutator brushes bearing thereon, will effect the desired result as is well understood by electricians, the adjustment being, in any case, however, one such that the effectiveness of the motor will be decreased when the speed increases. As will be readily understood by electricians this adjustment is one radically different from an adjustment made for the purpose of keeping the brushes at a non-sparking point or neutral point such as in the case of a dynamo machine would be the points of maximum current on the commutator.

What I claim as my invention is—

1. The combination with an electric motor, of a shunting switch, a detent therefor, and devices responding to changes in the speed of the motor for controlling the detent, whereby said switch may be released to cut off current from the motor at a predetermined increase in the speed.

2. The combination with an electric motor, of a shunting switch controlling a shunt circuit around the armature coils and independent of the field magnet coils, and devices responding to an increase in the speed of the armature for causing the operation of said switch, on an increase of the speed to a predetermined point.

3. The combination with an electric motor, of a stopping switch, a detent therefor, and devices responsive for changes in the speed of the motor for controlling the detent whereby said switch may be released to stop the motor at a predetermined increase in the speed.

Signed at Lynn, in the county of Essex and State of Massachusetts, this 26th day of August, A. D. 1884.

ELIHU THOMSON.

Witnesses:
A. V. SEYMOUR,
W. O. WAKEFIELD.